United States Patent [19]

Yamada et al.

[11] Patent Number: 4,832,713
[45] Date of Patent: May 23, 1989

[54] GAS-SELECTIVELY PERMEABLE MEMBRANE AND METHOD OF FORMING SAID MEMBRANE

[75] Inventors: Katsuya Yamada; Koichi Okita, both of Osaka, Japan

[73] Assignee: Sumitomo Electric Industries, Ltd., Osaka, Japan

[21] Appl. No.: 42,554

[22] Filed: Apr. 27, 1987

Related U.S. Application Data

[63] Continuation of Ser. No. 563,486, Dec. 20, 1983, abandoned.

[30] Foreign Application Priority Data

Dec. 21, 1982 [JP]  Japan ................................ 57-225364
Jan. 8, 1983 [JP]  Japan .................................. 58-1602

[51] Int. Cl.$^4$ ............................................. B01D 59/12
[52] U.S. Cl. .................................... 55/158; 210/490; 210/500.39; 264/41
[58] Field of Search ...................... 55/16, 158; 264/41, 264/22; 210/500.39, 490

[56] References Cited

U.S. PATENT DOCUMENTS 3,615,024  10/1971  Michaels ............................ 210/490
3,992,495  11/1976  Sano et al. ................... 210/500.2 X
4,156,597   5/1979  Browall ............................. 55/70 X

*Primary Examiner*—Frank Spear
*Attorney, Agent, or Firm*—Sughrue, Mion, Zinn, Macpeak, and Seas

[57] ABSTRACT

A gas-selectively permeable membrane and a method of forming said membrane are described. This membrane is an asymmetrical pore diameter structure film made of a polyetherimide having the recurring unit represented by formula (A) or a mixture of said polyetherimide and at least one polymer having the recurring unit represented by formula (B), wherein the means pore diameter of a dense layer of the asymmetrical pore diameter structure film is 0.5 micron or less and the means thickness of the dense layer is 10 microns or less:

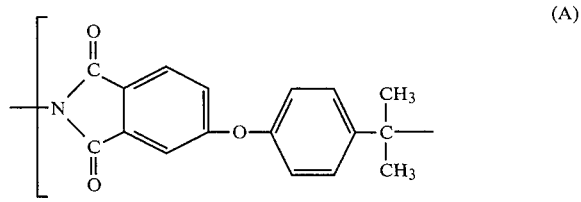

(A)

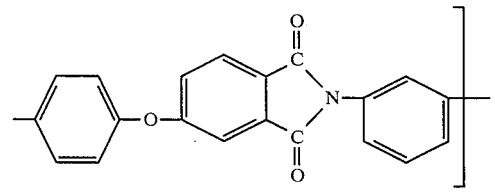

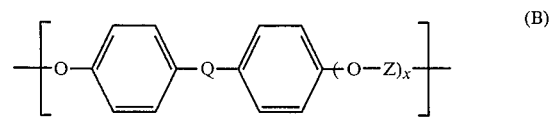

(B)

wherein all the symbols are defined in the specification. This membrane is superior in heat resistance and is suitable for use in the isolation of argon from air, for the concentration of oxygen, for the concentration of hydrogen in twon gas, and so forth.

4 Claims, 3 Drawing Sheets

X400

X200

X700

X400

X400

X200

X3000

GAS-SELECTIVELY PERMEABLE MEMBRANE AND METHOD OF FORMING SAID MEMBRANE

This is a continuation of application Ser. No. 563,486, filed Dec. 20, 1983, now abandoned.

FIELD OF THE INVENTION

The present invention relates to a gas-selectively permeable membrane and a method of forming the membrane. More particularly, the present invention relates to a gas-selectively permeable membrane comprising an asymmetrical pore diameter structure film of a polyetherimide or a polymer mixture containing said polyetherimide, or a composite gas-selectively permeable membrane comprising an asymmetrical pore diameter structure film of a polyetherimide or a polymer mixture containing said polyetherimide and at least one thin polymer film, particularly a plasma polymerization thin polymer film on the asymmetrical pore diameter structure film, and a method of forming such membranes.

BACKGROUND OF THE INVENTION

In recent years, extensive research has been conducted on the separation and purification of a fluid mixture using a selectively permeable membrane in place of conventional techniques based on a phase change such as distillation and freezing, which require a large amount of energy.

Processes for separation and purification using such a membrane which are presently in practical use on a commercial scale are directed mainly to liquid/liquid separation, such as the production of fresh water from sea water, disposal of waste water from factories, and concentration of foods, and liquid/solid separation. In connection with gas/gas separation, basically no process has yet been put to practical use. The major reasons for this are:

(1) selective permeability or gas selectivity is poor; that is, since no membrane is available which allows a specific gas to pass therethrough but does not essentially allow other gases to pass therethrough, it is necessary to employ a multistage system in which membrane separation is repeatedly applied when a specific gas of high purity is to be produced. Accordingly, large-sized equipment is needed; and (2) gas permeability is poor; therefore, it is difficult to treat a large amount of a gas mixture. In particular, when gas selectivity is increased, gas permeability tends to drop, whereas when gas permeability is increased, gas selectivity tends to fall. This problem has not yet been satisfactorily overcome.

Typical membrane forming methods which have been employed to prepare a satisfactory membrane include a method in which an asymmetrical pore diameter structure membrane whose active skin layer is reduced in thickness as much as possible is formed by casting a polymer solution, and a method in which a superthin membrane corresponding to the active skin layer is separately prepared and provided on a porous support to form a composite membrane. These methods to improve gas permeability are not always suitable for practical use because commercially available polymers fail to satisfy all desired physical properties; that is, commercially available polymers or copolymers are satisfactory in at least one of selective permeability, permeability, heat resistance, chemical resistance, strength, and so forth, but are not satisfactory in other properties.

It has, therefore, been desired to develop polymers which are of high heat resistance and can be produced inexpensively. A typical example of such a polymer is a polysulfone. This polysulfone, however, is not satisfactory in respect of production cost.

SUMMARY OF THE INVENTION

The present invention relates to:

a gas-selectively permeable membrane which is an asymmetrical pore diameter structure film made of a polyetherimide having the recurring unit represented by formula (A) as described hereinafter, or a mixture of the polyetherimide and at least one polymer having the recurring unit represented by formula (B) as described hereinafter, wherein the mean pore diameter of a dense layer of the asymmetrical pore diameter structure film is 0.5 micron or less and the mean thickness of the dense layer is 10 microns or less; and a composite gas-selectively permeable membrane comprising the asymmetrical pore diameter structure film as described above and at least one thin polymer film provided on the dense layer of the asymmetrical pore diameter structure film; and a method of forming the gas-selectively permeable membrane as described above which comprises applying a solution containing the polyetherimide having the recurring unit represented by formula (A) as described hereinafter, or a mixture of the polyetherimide and at least one polymer having the recurring unit represented by formula (B) as described hereinafter, a solvent, and if desired or necessary, a swelling agent to form a film, bringing the thus-formed film into contact with a coagulating agent to remove the solvent, and then drying; and a method of forming the composite gas-selectively permeable membrane as described above which comprises further providing the thin polymer film on the gas-selectively permeable membrane.

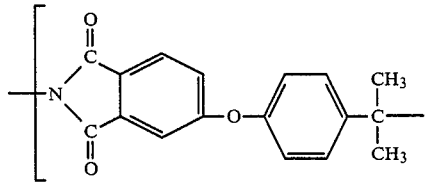

(A)

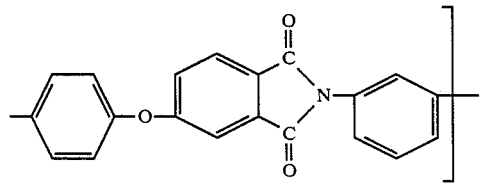

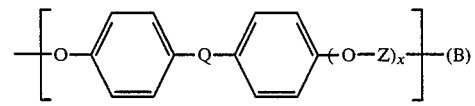

(B)

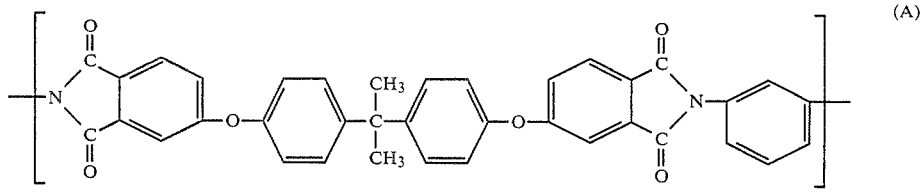

Figure 1A:
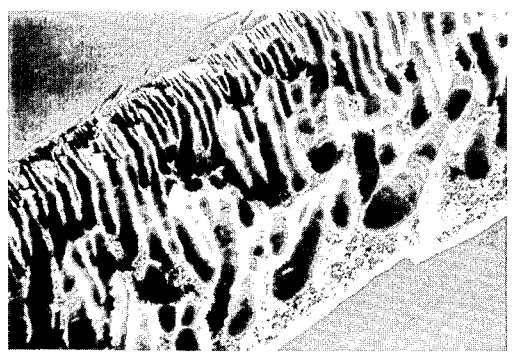
FIG. 1-*a* is a scanning electron microscopic photograph of the cross section of an asymmetrical pore diameter structure film made of a 4:1 (weight ratio, hereinafter the same) mixture of aromatic polyester.
Figure 1B:
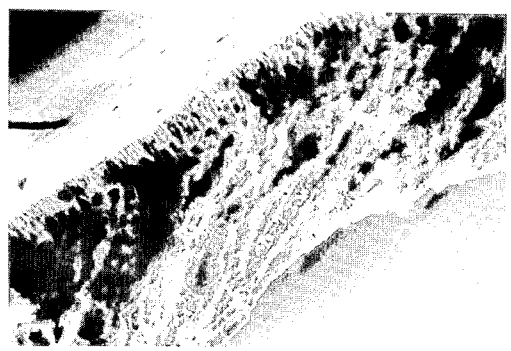
Figure 1C:
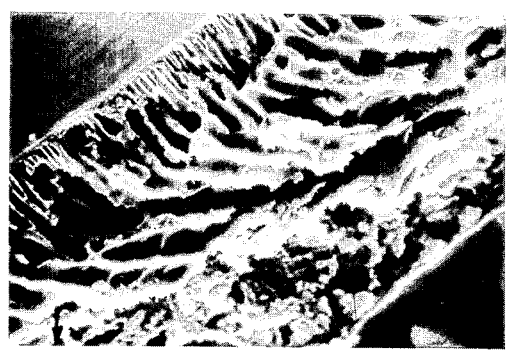
Figure 2:
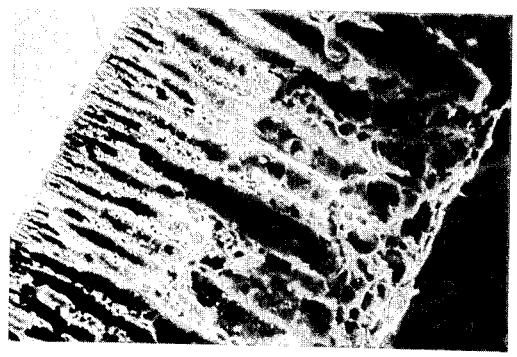
Figure 3:
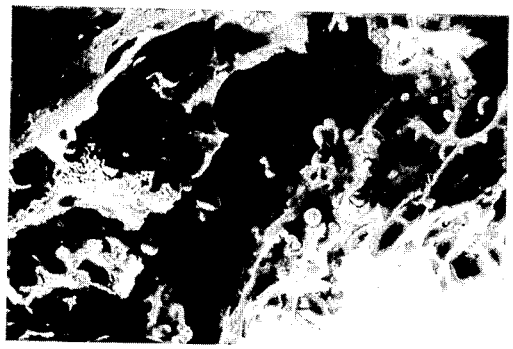

polyetherimide (400 magnification);

FIG. 1-*b* is a scanning electron microscopic photograph of the cross section of an asymmetrical pore diameter structure film made of a 1:1 mixture of aromatic polyester and polyetherimide (200 magnification);

FIG. 1-*c* is a scanning electron microscopic photograph of the cross section of an asymmetrical pore diameter structure film made of a 1:4 mixture of aromatic polyester and polyetherimide (700 magnification);

FIG. 2 is a scanning electron microscopic photograph of the cross section of an asymmetrical pore diameter structure film made of a 4:1 mixture of polycarbonate and polyetherimide (400 magnification);

FIG. 3 is a scanning electron microscopic photograph of the cross section of an asymmetrical pore diameter structure film made of a 1:1 mixture of polysulfone and polyetherimide (400 magnification).

In all the photographs, the left upper portion is a dense layer.

Figure 4A:
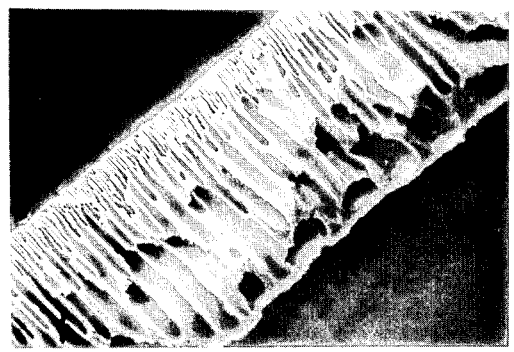
Figure 4B:

FIG. 4-*a* is a scanning electron microscopic photograph of the cross section of an asymmetrical pore diameter structure film made of a 1:1 mixture of polysulfone and polyetherimide (400 magnification).

In all the photographs, the left upper portion is a dense layer.

FIG. 4-*a* is a scanning electron microscopic photograph of the cross section of an aymmetrical pore diameter structure film made of polyetherimide (200 magnification) wherein the left upper portion is a dense layer; and FIG. 4-*b* is an enlarged view of the vicinity of the dense layer of FIG. 4-*a*(3,000 magnification).

DETAILED DESCRIPTION OF THE INVENTION

The asymmetrical pore diameter structure films are disclosed in, for example, S. Loeb, S. Sourirajan, *Advan. Chem. Ser.*, 38, 117 (1963) and U.S. Pat. No. 3,775,308. These films comprise a dense layer and a non-dense (porous) layer.

As stated above, polysulfones typically have the defects that gas permeability is poor, although they are superior in heat resistance, chemical resistance, strength, and so forth.

In order to overcome the foregoing problem, in the present invention, the asymmetrical pore diameter structure film is formed using a polyetherimide or a polymer mixture containing the polyetherimide in place of polysulfone.

That is, one of the features of the present invention is to use as a raw material for the asymmetrical pore diameter structure film a polyetherimide, or a polymer mixture containing said polyetherimide, which is different from polysulfone, is inexpensive and has high heat resistance.

The polyetherimides used herein are polymers having a molecular weight of 10,000 to 50,000 and preferably 25,000 to 40,000, and the recurring unit represented by formula (A):

and are prepared by condensation reaction of phenoxyphenyldicarboxylic acid anhydrides (such as 2,2-bis-4-(3,4-dicarboxyphenoxy) phenyl propane anhydride) and phenylenediamines (such as methaphenylenediamine). In the phenoxyphenyldicarboxylic acid anhydrides, the carboxy and phenoxy groups may be located at 3,3'-, 4,4'- or 3,4'- positions. In addition, a mixture of such 3,3'-, 4,4'- and 3,4'-substituted compounds may be used. Although it is most preferred for the propane to take a —C(CH$_3$)$_2$- structure, it may be —CH$_2$—CH$_2$—CH$_2$—or —CH$_2$—CH(CH$_3$)—. In —CH$_n$H$_{2n}$—other than the propane, n may be within the range of from 1 to 8.

The methods for preparing the polyetherimides are disclosed in, for example, U.S. Pat. Nos. 372,741 and 421,262.

The polymers mixed with the polyetherimides have the recurring unit represented by formula (B):

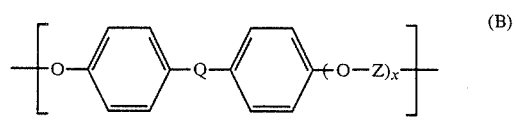

wherein x is a natural number including zero (0),

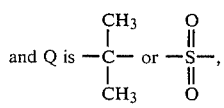

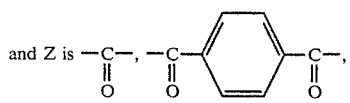

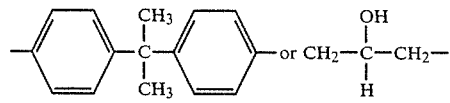

The above polymers have a molecular weight of 10,000 to 50,000. Typical examples of such polymers are as follows:

Polycarbonates having the recurring unit represented by the formula:

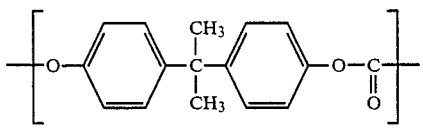

Aromatic polyesters having the recurring unit represented by the formula:

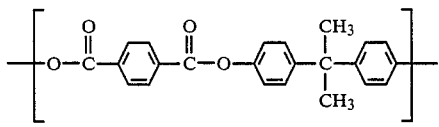

Polysulfones having the recurring unit represented by the formula:

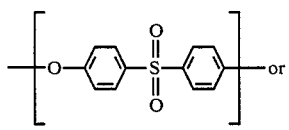 or

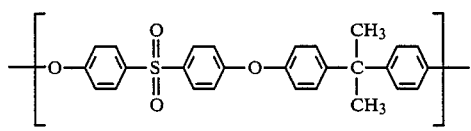

The polyetherimide or the polymer mixture containing the polyetherimide can be dissolved in chlorine-based solvents, such as chloroform and trichloroethylene, cyclic ether solvents, such as tetrahydrofuran and dioxane, amide solvents, such as dimethylformamide, or nitrogen-containing cyclic solvents, such as N-methyl-2-pyrrolidone, N-formylpiperidine, and 1-formylmorpholine. Of these solvents, the chlorine-based solvents and cyclic ether solvents can dissolve the polyetherimide or the polymer mixture therein easily up to a concentration of 10% by weight based on the resulting solution, but if the concentration exceeds 15% by weight, same basis, many of the resulting solutions tend to become viscous rapidly. On the other hand, the amide solvents and nitrogen-containing cyclic solvents exhibit a high ability to dissolve therein the polyetherimide or the polymer mixture; that is, the polyetherimide or the polymer mixture is soluble even up to a concentration of 20 to 30% by weight, same basis, without causing problems such as a serious increase in viscosity, excessive phase separation, and precipitation. Thus, of the solvents as described above, the amide and nitrogen-containing cyclic solvents are particularly preferred. The polymer concentration in the solvent is about 5 to 40% by weight, and preferably 15 to 35% by weight.

The above-described solvents can be used individually or in combination with one another. When a mixture of a solvent having a relatively high boiling point (e.g., dimethylformamide) with a solvent having a relatively low boiling point (e.g., tetrahydrofuran and dichloromethane) is used, a mean pore diameter of a dense layer obtained can be reduced or a mean thickness of the dense layer can be increased.

It is also possible to add to the above-described solvent or solvent mixture an inorganic or organic swelling agent. Examples of inorganic swelling agent include halogenides, nitrates and sulfates of alkali metals or alkaline earth metals, such as lithium chloride, potassium chloride, lithium bromide, potassium bromide, lithium nitrate and magnesium sulfate. They are used in an amount of 200 parts by weight or less, and preferably 150 parts by weight or less for 100 parts by weight of the polyetherimide or the polymer mixture containing the polyetherimide.

Examples of the organic swelling agent include ethylene glycol, diethylene glycol, polyethylene glycol and methyl ether derivatives thereof, polypropylene glycol and derivatives thereof, and polyhydric alcohol such as glycerin and 1,3-propanediol. They are used in the same amount or somewhat larger amount as the inorganic swelling agents described above. By the addition of the swelling agent a mean pore diameter of a dense layer obtained can be increased or a mean thickness of the dense layer can be reduced. Further, when a non-dense (porous) layer obtained has a relatively small pore diameter, the diameter can be increased by the addition of the swelling agent.

The thus-prepared solution is uniformly flowed onto a support plate by means of a doctor knife and then gelled by dipping in a non-solvent, that is, a coagulating agent, usually water, or gelled after partial evaporation of the solvent in the solution to form an asymmetrical pore diameter structure film of the polyetherimide or the polymer mixture containing the polyetherimide. Of course, a tubular member can be formed using a tubular nozzle.

The structure and characteristics of the asymmetrical pore diameter structure film are influenced by the type of the polymer, the mixing ratio of the polymer mixture, the concentration of the solution, the type of the solvent, the amount of the additive, and so forth. In general, as the concentration is increased, gas selective permeability increases, but gas permeability drops. As the mixing ratio of the polymer to the polyetherimide approaches 1:1 (weight ratio, hereinafter the same), the mean pore diameter increases and the gas permeability increases, but the gas selective permeability drops.

These effects will hereinafter be explained with reference to the accompanying photographs.

FIG. 1-a is a scanning electron microscopic photograph of the cross section of an asymmetrical pore diameter structure film made of a 1:4 mixture of polyetherimide and aromatic polyester.

FIG. 2 is a scanning electron microscopic photograph of the cross section of an asymmetrical pore diameter structure film made of a 1:4 mixture of polyetherimide and polycarbonate.

In the asymmetrical pore diameter structure film of FIG. 1-a, inner pores extend to the bottom surface vertically relative to the surface of the film and are oriented in a regular pattern as compared with those in FIG. 2. Furthermore, the sponge structure of the walls partitioning the inner pores is denser than that of FIG. 2.

This difference is due to a difference in the solubility parameter between the aromatic polyester and polycarbonate. A difference in compatibility between polyetherimide/aromatic polyester and polyetherimide/polycarbonate results in the difference in the asymmetrical pore diameter film structure. Hence, by using polymers having different compatibilities, it is possible to change the asymmetrical pore diameter film structure, the mean pore diameter and gas permeability. The use of combination of polymers having good compatibility to each other can provide a regularly disposed asymmetrical structure.

FIG. 1-b is a scanning electron microscopic photograph of the cross section of an asymmetrical pore diameter structure film made of a 1:1 mixture of polyetherimide and aromatic polyester, and FIG. 1-c is a scanning electron microscopic photograph of the cross section of an asymmetrical pore diameter structure film made of a 4:1 mixture of polyetherimide and aromatic polyester.

The structures shown in FIG. 1-a and 1-c are nearly equal. In FIG. 1-b, however, there can be found regularly oriented longitudinal pores which can be observed in FIGS. 1-a and 1-c only in the limited areas near the dense layer, and a sponge-like structure having a large mean pore diameter is observed in the structures. At a mixing ratio at which the contact interface between different polymers increases, that is, generally a mixing ratio approaching 1:1, the reduction in compatibility between the different polymers reaches a maximum. The characteristics of such a dope solution are responsible for the distortion of the structure in the asymmetrical pore diameter structure film, an increase in the mean pore diameter and irregularity of the surface dense layer. This demonstrates that the structure of the asymmetrical pore diameter structure film, the mean pore diameter and gas permeability can be changed by controlling the mixing ratio of the polymers.

Another feature of the present invention is that on the surface of the dense layer side of the asymmetrical pore diameter structure film described above a thin polymer film of high gas permeability is laminated or a plasma polymerization thin film is deposited by glow discharge to obtain the composite film having a further improved gas permeability.

This feature is preferably applied to the asymmetrical pore diameter structure film having a relatively low gas selective permeability.

When the mean pore diameter of the dense layer is 0.001 micron or less, the original gas selective permeability is exhibited, but when it exceeds 0.01 micron, the selective permeability is relatively low.

Within this pore diameter range, selective permeability can be recovered by laminating a thin film through, e.g., dipping in a different polymer solution or direct plasma polymerization.

When the mean pore diameter of the dense layer is within the range of from 0.1 to 0.5 micron, it is preferred to slightly increase the thickness of the asymmetrical pore diameter structure film by increasing the thickness of the coated polymer layer and the concentration of the polymer. When, however, the mean pore diameter exceeds 0.5 micron, it becomes difficult to form a polymer film having high gas selective permeability.

The thickness of the thin polymer film formed by lamination is about 50 microns or less, and preferably about 30 microns or less, however, the thickness can be further reduced within a range such that the pores in the dense layer can be closed or plugged by the lamination. The thickness of the thin polymer film formed by plasma polymerization is about 1 micron or less, and preferably about 0.3 micron or less.

A thin film of a rubber-based polymer such as polysiloxane is preferably laminated on the asymmetrical pore diameter structure film. In order to prepare a composite membrane of high selectivity, preferably a plasma polymerization thin film is deposited on the asymmetrical pore diameter structure film directly or after the lamination of the rubber-based polymer thin film. High permeability can be maintained by depositing a super thin polymer film of 1 micron or less and, furthermore, as a raw material for use in polymerization, a compound of high gas selective permeability can be chosen from a wide range.

In this feature of the present invention, the mean pore diameter of the dense layer is adjusted within a range such that the pores can be closed or plugged by the formation and deposition of the plasma polymerization film. If the mean pore diameter of the dense layer is more than 0.1 micron, the pores cannot be plugged by the plasma polymerization film. On the other hand, if the mean pore diameter is 0.001 micron or less, the pores can be easily plugged, but gas permeability seriously drops. As a matter of course, the mean pore diameter which can be plugged by the plasma polymerization film varies slightly depending on the type of the monomer and the plasma polymerization conditions. In the present invention, the mean pore diameter of the dense layer is 0.5 micron or less, however, in this feature of the present invention it is generally preferred that the mean pore diameter is in the range between 0.01 and 0.1 micron.

Monomers for use in the plasma polymerization will hereinafter be explained.

It is known that various monomers such as ethylene and acetylene undergo plasma polymerization in an atmosphere in which a glow discharge is applied. In the present invention, it is preferred to use compounds having a tertiary carbon-containing group

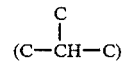

as a functional group and organosilane compounds. Examples of such tertiary carbon-containing compounds include tert-butyl compounds such as tert-butylamine, pentene derivatives such as 4-methyl-1-pentene, octenes such as 1-octene and isoprene.

Organosilane compounds which can be used include tetramethylsilane, hexamethylsilane, methyldichlorosilane, and methyltrichlorosilane. More preferred are organosilane compounds containing an unsaturated bond, such as trimethylvinylsilane, dimethylvinylchlorosilane, vinyltrichlorosilane, methylvinyldichlorosilane, methyltrivinylsilane, allyltrimethylsilane, and ethynyltrimethylsilane.

A gas-selectively permeable membrane is preferably prepared by depositing a plasma polymerization thin film directly on the dense layer of an asymmetrical pore diameter structure film of the polyetherimide or the polymer mixture containing the polyetherimide, having a pore diameter range of from 0.001 to 0.1 micron. It is required for the raw material for use in the preparation of the film to have superior characteristics. It is further necessary that the constituent controlling the permeability should be reduced to the lowest possible thickness. The reason for this is as follows:

The characteristics of the raw material are evaluated by the gas permeation coefficient thereof:

$$P = cm^3 \cdot cm/cm^2 \cdot sec \cdot cm\ Hg$$

which is calculated with the thickness of the raw material as 1 cm. On the other hand, the characteristics of the composite membrane is evaluated by the permeation rate per the thickness of the raw material itself:

$$Q = cm^3/cm^2 \cdot sec \cdot cm \; Hg$$

Hence, the permeation rate of a 1 micron thick membrane is ten times that of a 10 micron thick membrane although their permeation coefficients are the same. Hence, the characteristics required actually are the permeation rate and the thickness of the membrane.

In the present invention, the asymmetrical pore diameter structure film made of the polyetherimide or the polymer mixture containing the polyetherimide and further a second polymer, having a pore diameter range as described above is dried and, thereafter, a plasma polymerization layer is deposited on the surface of the dense layer in a thickness of 1 micron or less, preferably 0.3 micron or less. For example, the pressure of the plasma polymerization chamber is lowered to 5 torr or less, preferably 2 torr or less, a mixed gas of an unpolymerizable gas and a polymerizable gas is introduced into the chamber, and when a high frequency glow discharge is applied at a predetermined output of, e.g., from 5 to 500 W, preferably about 20 W, the polymerizable gas undergoes plasma polymerization, depositing as a thin film on the surface of the dense layer of the asymmetrical pore diameter structure film. The thickness of the thin film increases nearly in proportion to the time of glow discharge or the flow rate of the polymerizable gas and, therefore, it can be adjusted to an appropriate value. Furthermore, as the output of glow discharge is increased or decreased, the thickness of the deposited film increases or decreases. These film-forming conditions can be easily optimized by one skilled in the art. In any case, it is necessary in the present invention that a defect-free uniform polymerization film be deposited at a thickness as described above.

One of the criteria in selecting the polymerizable gas is that the plasma polymerization thin film prepared therefrom prevents as much as possible the passage of one component of a mixed gas to be separated since the thickness of the plasma polymerization thin film is as low as 1 micron and preferably 0.3 micron or less. Plasma polymerizable monomers commonly used, such as ethylene and styrene, satisfy the criterion as described above. However, compounds containing a tertiary carbon as a functional group as described above are preferred for use in the present invention. More preferred are those compounds further containing a double bond. In addition, the organosilane compounds as described above are preferred for use in the present invention. Of these organosilane compounds, compounds containing an unsaturated functional group such as a double bond or triple bond are more preferred.

Plasma polymerization techniques which can be utilized in the present invention are disclosed in detail in U.S. Pat. No. 3,847,652.

In using an asymmetrical pore diameter structure film made of a polyetherimide or a polymer mixture containing said polyetherimide and having a mean pore diameter of 0.1 micron or more, it is preferred to deposit thereon a thin film of a polymer having high gas permeability. Silicone rubbers such as polydimethyl siloxane are preferred from the viewpoint of gas permeability and heat resistance. In particular, RTV-type and LTV-type silicone rubbers, both being low temperature vulcanization type and of the two-pack reaction type, are convenient for use in impregnation into the interior of fine pores in the asymmetrical pore diameter structure film or in reactions after the impregnation since they become polymeric compounds undergoing the condensation and addition reactions described below.

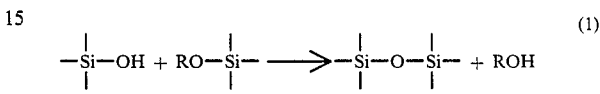

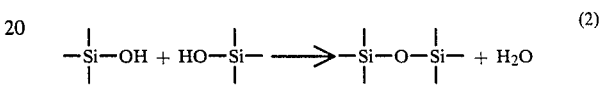

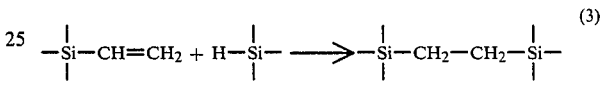

They are also convenient in that before the reaction they can be converted into a low viscosity solution with which the pores of the asymmetrical pore diameter structure film of the present invention can be easily impregnated.

As one technique to increase gas selective permeability, a plasma polymerization thin film can further be deposited on the composite material having a silicone rubber laminated thereto. Another technique is that where a plasma polymerization thin film is deposited on the asymmetrical pore diameter structure film of the polyetherimide or the polymer mixture containing the polyetherimide and then the silicone rubber is laminated on the plasma polymerization thin film.

The present invention is described in greater detail by reference to the following Examples.

EXAMPLE 1

A dope solution was prepared, consisting of 10% by weight of polyetherimide, ULTEM-1000 (produced by General Electric Co.), 40% by weight of N-methyl-2-pyrrolidone, and 50% by weight of tetrahydrofuran. ULTEM-1000 has the recurring unit shown below and has a molecular weight of about 32,000.

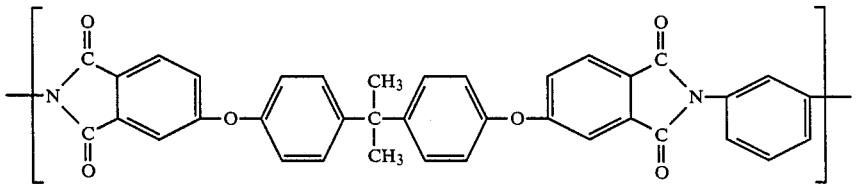

This dope solution was flowed over a smooth glass plate in a thickness of 300 microns by means of a doctor knife. The entire glass plate was soaked in distilled water at room temperature to coagulate the dope solution. The thus-formed film was peeled off, washed with water for 2 hours, and dried by blowing air at 45° C. for 2 hours to prepare about a 90 micron thick asymmetrical pore diameter structure film.

Scanning electron microscopic analysis showed that the cross section of the film had an asymmetrical pore diameter structure.

The gas permeation characteristics of the film were measured using air as a feed gas. The oxygen permeation rate $QO_2$ was about $3.2 \times 10^{-6}$ cm$^3$/cm$^2$·sec·cm Hg, and the oxygen/nitrogen selectivity $\alpha$ (oxygen permeation rate/nitrogen permeation rate) was about 4.9.

The oxygen permeation rate per centimeter of thickness, i.e., the oxygen permeation coefficient, $PO_2$ (calculated from $QO_2$) was about $2.9 \times 10^{-8}$ cm$^3$·cm/cm$^2$·sec·cm Hg.

EXAMPLE 2

A dope solution was prepared, consisting of 20% by weight of the polyetherimide ULTEM-1000 and 80% by weight of N-methyl-2-pyrrolidone.

This dope solution was flowed over a smooth glass plate in a thickness of 300 microns by means of a doctor knife. The entire glass plate was soaked in distilled water at room temperature to coagulate the dope solution. The thus-formed film was peeled off, washed with water for 2 hours, and dried by blowing air at 45° C. for 2 hours to prepare about a 150 micron thick asymmetrical pore diameter structure film.

The gas permeation characteristics of the film were measured in the same manner as in Example 1 and the results were as follows:

$QO_2 \approx 2.0 \times 10^{-5}$ cm$^3$/cm$^2$·sec·cm Hg $PO_2 \approx 3.0 \times 10^{-7}$ cm$^3$·cm/cm$^2$·sec·cm Hg Scanning electron microscopic analysis showed that the cross section of the film had an asymmetrical pore diameter structure as shown in FIG. 4-a and 4-b.

EXAMPLE 3

A dope solution was prepared, consisting of 16% by weight of polysulfone (Udel P-1700 produced by U.C.C.), 4% by weight of the polyetherimide, ULTEM-1000, 60% by weight of N-methyl-2-pyrrolidone, and 20% by weight of tetrahydrofuran.

Udel P-1700 has the recurring unit shown below and has a molecular weight of about 28,000.

[chemical structure]

This dope solution was flowed over a smooth glass plate in a thickness of 300 microns by means of a doctor knife and was allowed to stand for 2 minutes. At the end of the time, the entire glass plate was soaked in distilled water at room temperature to coagulate the dope solution. The thus-formed film was peeled off, washed with water for 2 hours, and dried by blowing air at 45° C. for 2 hours to prepare about a 120 micron thick asymmetrical pore diameter structure film.

It was confirmed by scanning electron microscopic analysis that the cross section of the film had an asymmetrical pore diameter structure.

The gas permeation characteristics of the film were as follows:

$QO_2 \approx 8.5 \times 10^{-6}$ cm$^3$/cm$^2$·sec·cm Hg $PO_2 \approx 1.0 \times 10^{-7}$ cm$^3$·cm/cm$^2$·sec·cm Hg $\alpha \approx 2.1$

EXAMPLES 4 to 7

Asymmetrical pore diameter structure films were prepared in the same manner as in Example 1 except that dope solutions having the compositions as shown in Table 1 were used.

The thickness and gas permeation characteristics of each film are shown in Table 2.

It was confirmed by scanning electron microscopic analysis that the cross section of the film had an asymmetrical pore diameter structure.

COMPARATIVE EXAMPLE 1

A dope solution was prepared, consisting of 20% by weight of the polysulfone, Udel P-1700, and 80% by weight of N-methyl-2-pyrrolidone.

This dope solution was flowed over a smooth glass plate in a thickness of 150 microns by means of a doctor knife and, thereafter, dried in an atmosphere of air maintained at 250° C. for 2 hours to prepare about a 23 micron thick dense film. The specific gravity of the film was 1.24.

The gas permeation characteristics of the film were as follows:

$QO_2 \approx 9.1 \times 10^{-8}$ cm$^3$/cm$^2$·sec·cm Hg $PO_2 \approx 2.1 \times 10^{-10}$ cm$^3$·cm/cm$^2$·sec·cm Hg $\alpha \approx 6.0$

COMPARATIVE EXAMPLES 2 TO 4

Dense films were prepared in the same manner as in Comparative Example 1 except that dope solutions having the compositions as shown in Table 3 were used.

The thickness, specific gravity, and gas permeation characteristics of each film are shown in Table 4.

EXAMPLE 8

An asymmetrical pore diameter structure film was prepared in the same manner as in Example 2. A solution consisting of 20% by weight of silicone rubber ($\alpha \approx 2$) (an equimolar mixture of vinyl siloxane and hydrogen siloxane both having a viscosity of about 7,000 poise) and 80% by weight of Freon 113 (trifluorotrichloroethane produced by Daikin Kogyo Co., Ltd.) was coated on the asymmetrical pore diameter structure film as prepared above in a thickness of 150 microns and vulcanized with hot air at 120° C. for 40 minutes to prepare a composite membrane.

The gas permeation characteristics of the composite membrane were as follows:

$QO_2 \approx 7.1 \times 10^{-6}$ cm$^3$/cm$^2$·sec·cm Hg $\alpha \approx 2.9$

EXAMPLE 9

A composite membrane was prepared in the same manner as in Example 8. This composite membrane was placed in a reaction chamber, and a glow discharge was applied at an output of 20 w while introducing trimethylvinylsilane at a flow rate of 0.7 cm³/min to deposit a plasma polymerization film on the outermost layer of the composite membrane.

The gas permeation characteristics of the three-layer composite membrane as prepared above were as follows:

$QO_2 \approx 8.7 \times 10^{-7} cm^3/cm^2 \cdot sec \cdot cm\ Hg$ $\alpha \approx 5.8$

EXAMPLE 10

An asymmetrical pore diameter structure film was prepared in the same manner as in Example 5. A solution consisting of 20% by weight of the silicone rubber ($\alpha \approx 2$) which is the same as used in Example 8 and 80% by weight of Freon 113 was coated on the surface of a dense layer of the symmetrical pore diameter structure film in a thickness of 140 microns and vulcanized with hot air at 170° C. for 30 minutes to prepare a composite membrane.

The gas permeation characteristics of the composite membrane were as follows:

$QO_2 \approx 6.9 \times 10^{-6} cm^3/cm^2 \cdot sec \cdot cm\ Hg$ $\alpha \approx 2.4$

EXAMPLE 11

A composite membrane was prepared in the same manner as in Example 10 except that an asymmetrical pore diameter structure film as prepared in the same manner as in Example 6 was used.

The gas permeation characteristics of the composite membrane were as follows:

$QO_2 \approx 5.8 \times 10^{-6} cm^3/cm^2 \cdot sec \cdot cm\ Hg$ $\alpha \approx 2.2$

EXAMPLE 12

A composite membrane was prepared in the same manner as in Example 10. This composite membrane was placed in a reaction chamber, and a glow discharge was applied at an output of 20 w for 30 minutes while introducing trimethylvinylsilane at a flow rate of 0.7 cm³/min to deposit a plasma polymerization film on the outermost layer of the composite membrane.

The gas permeation characteristics of the three-layer composite membrane as prepared above were as follows:

$QO_2 \approx 1.9 \times 10^{-6} cm^3/cm^2 \cdot sec \cdot cm\ Hg$ $\alpha \approx 3.5$

EXAMPLE 13

An asymmetrical pore diameter structure film was prepared in the same manner as in Example 2 except that a dope solution consisting of 20% by weight of the polyetherimide, ULTEM-1000, 60% by weight of N-methyl-2-pyrrolidone, and 20% by weight of tetrahydrofuran was used.

The gas permeation characteristics of the asymmetrical pore diameter structure film were as follows:

$QO_2 \approx 9.0 \times 10^{-6} cm^3/cm^2 \cdot sec \cdot cm\ Hg$ $\alpha \approx 1.4$ This asymmetrical pore diameter structure film was placed in a reaction chamber, and a glow discharge was applied at an output of 20 w for 30 minutes while introducing trimethylvinylsilane at a flow rate of 0.7 cm³/min to deposit a plasma polymerization film on the surface of the dense layer.

The gas permeation characteristics of the composite membrane as prepared above were as follows:

$QO_2 \approx 3.1 \times 10^{-8} cm^3/cm^2 \cdot sec \cdot cm\ Hg$ $\alpha \approx 5.3$

EXAMPLE 14

An asymmetrical pore diameter structure film was prepared in the same manner as in Example 3. This asymmetrical pore diameter structure film was placed in a reaction chamber, and a glow discharge was applied at an output of 20 w for 30 minutes while introducing trimethylvinylsilane at a flow rate of 0.7 cm³/min to deposit a plasma polymerization film on the dense layer of the asymmetrical pore diameter structure film.

The gas permeation characteristics of the composite membrane as prepared above were as follows:

$QO_2 \approx 2.6 \times 10^{-6} cm^3/cm^2 \cdot sec \cdot cm\ Hg$ $\alpha \approx 3.7$

TABLE 1

| Example | Dope Solution | | | | | |
|---|---|---|---|---|---|---|
| | Polymer I | | Polymer II | | Solvent | |
| | Polymer | wt % | Polymer | wt % | Solvent | wt % |
| 4 | A*1 | 10 | C*3 | 4 | NM2P*5 | 80 |
| 5 | B*2 | 10 | C | 4 | " | " |
| 6 | B | 10 | C | 10 | " | " |
| 7 | C | 10 | D*4 | 4 | " | " |

Note:
*1 Polysulfone: Udel P-1700 (produced by U.C.C.)
*2 Aromatic Polyester: U Polymer U-100 (produced by Unitika Co., Ltd.)
*3 Polyetherimide: ULTEM-1000 (produced by General Electric Co.)
*4 Polycarbonate: Upiron S-2000 (produced by Mitsubishi Gas Chemical Co., Ltd.)
*5 N—methyl-2-pyrrolidone U Polymer U-100 has the recurring unit shown below and has a molecular weight of about 28,000.

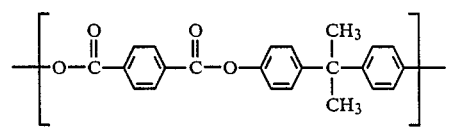

Upiron S-2000 has the recurring unit shown below and has a molecular weight of about 32,000.

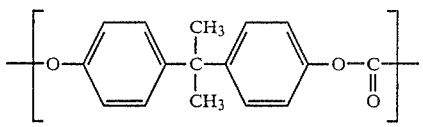

TABLE 2

| | | Physical Properties of Films | | |
| --- | --- | --- | --- | --- |
| | | Gas Permeation Characteristics | | |
| Example | Thickness ($\mu$) | $QO_2$ ($cm^3/cm^2 \cdot sec \cdot cmHg$) | $PO_2$ ($cm^3 \cdot cm/cm^2 \cdot sec \cdot cmHg$) | $\alpha$ ($QO_2/QN_2$) |
| 4 | 160 | $2.0 \times 10^{-4}$ | $3.2 \times 10^{-6}$ | 1.0 |
| 5 | 160 | $4.8 \times 10^{-5}$ | $7.7 \times 10^{-7}$ | 1.3 |
| 6 | 170 | $6.2 \times 10^{-5}$ | $1.1 \times 10^{-6}$ | 1.1 |
| 7 | 200 | $8.2 \times 10^{-5}$ | $1.6 \times 10^{-6}$ | 1.0 |

TABLE 3*

| | Dope Solution | | | |
| --- | --- | --- | --- | --- |
| Comparative | Polymer | | Solvent | |
| Example | Polymer | wt % | Solvent | wt % |
| 2 | B | 20 | NM2P | 80 |
| 3 | C | 20 | NM2P | 80 |
| 4 | D | 20 | NM2P | 80 |

*The same polymer designations in above Table 1 are used.

TABLE 4

| | | | Physical Properties of Films | | |
| --- | --- | --- | --- | --- | --- |
| | | Specific | Gas Permeation Characteristics | | |
| Comparative Example | Thickness ($\mu$) | Gravity | $QO_2$ $cm^3/cm^2 \cdot sec \cdot cmHg$ | ($cm^3 \cdot cm/cm^2 \cdot sec \cdot cmHg$) | $\alpha$ ($QO_2/QN_2$) |
| 1 | 23 | 1.24 | $9.1 \times 10^{-8}$ | $2.1 \times 10^{-10}$ | 6.0 |
| 2 | 15 | 1.21 | $2.0 \times 10^{-7}$ | $3.0 \times 10^{-10}$ | 5.2 |
| 3 | 14 | 1.29 | $3.3 \times 10^{-8}$ | $4.6 \times 10^{-11}$ | 7.6 |
| 4 | 15 | 1.20 | $6.8 \times 10^{-8}$ | $1.0 \times 10^{-10}$ | 5.3 |

The asymmetrical pore diameter structure films obtained in the present invention are superior in heat resistance and is suitable for use in the isolation of argon from air, for the concentration of oxygen, for the concentration of hydrogen in town gas and so forth.

While the invention has been described in detail and with reference to specific embodiments thereof, it will be apparent to one skilled in the art that various changes and modifications can be made therein without departing from the spirit and scope thereof.

What is claimed is:

1. A gas-selectively permeable membrane comprising:
    an asymmetrical pore diameter structure film made of a polyetherimide having the recurring unit represented by formula (A) or a mixture of said polyetherimide and at least one polymer having the recurring unit represented by formula (B), wherein the mean pore diameter of a dense layer of the asymmetrical pore diameter structure film is 0.5 micron or less, and the mean thickness of the dense layer is 10 microns or less,
    a silicone rubber thin film laminated on the dense layer of the asymmetrical pore diameter structure film, and
    at least one plasma polymerization thin film organosilane compound layer deposited on the silicone rubber thin film, the film layer being formed by glow discharge in the presence of an organosilane compound containing an unsaturated bond

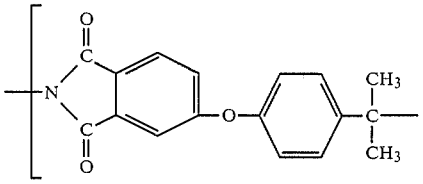

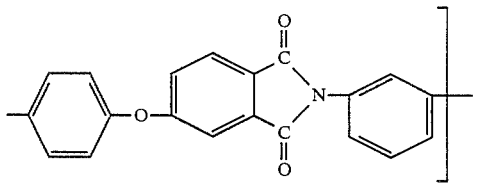

wherein x is a natural number including zero, Q is

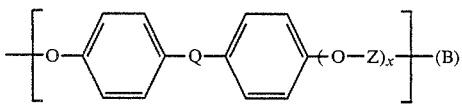

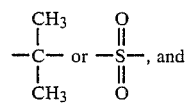

Z is

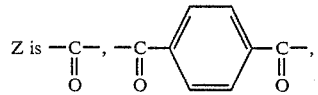

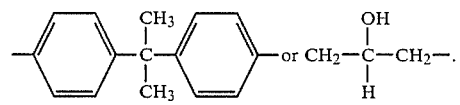

2. A method of forming the gas-selectively permeable membrane as claimed in claim 1, which comprises applying a solution containing a polyetherimide having the recurring unit represented by formula (A) or a mixture of said polyetherimide and at least one polymer having the recurring unit represented by formula (B), a solvent and if necessary a swelling agent, to form a film, bringing the thus-formed film into contact with a coagulating agent to remove the solvent, drying the film, and then coating a silicone rubber solution on the dense layer of the asymmetrical pore diameter structure film, drying the silicone rubber solution to laminate a silicone rubber thin film on the dense layer, and then applying glow discharge while supplying a polymerizable monomer in an atmosphere of 0.5 torr or less to deposit a plasma polymerization thin film on the silicone rubber thin film:

(A)

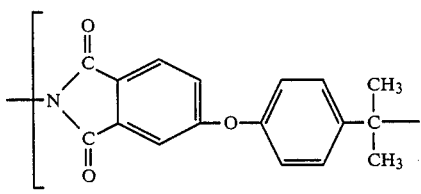

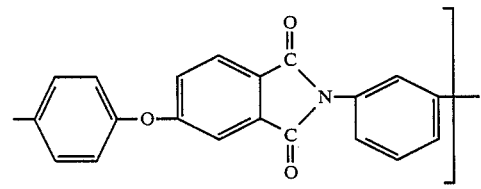

(B)

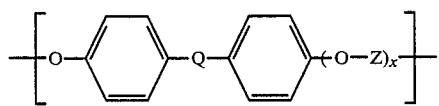

wherein x is a natural number including 0, Q is

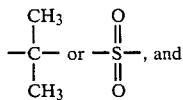

, and

Z is 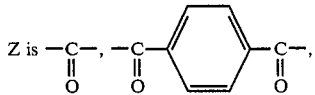

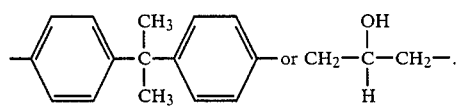

3. The method as claimed in claim 2, wherein the solvent is N-methyl-2-pyrrolidone, N-formylpiperidine, 1-formylmorpholine, tetrahydrofuran, or a mixture comprising two or more thereof.

4. The gas-selectivity permeable membrane according to claim 1, wherein the organosilane is selected from trimethylvinylsilane, dimethylvinylchlorosilane, vinyltrichlorosilane, methylvinyldichlorosilane, methyltrivinylsilane, allyltrimethylsilane, and ethynyltrimethylsilane.

* * * * *